(12) United States Patent  
Vajravel et al.

(10) Patent No.: US 11,209,862 B2  
(45) Date of Patent: Dec. 28, 2021

(54) KEYBOARD DOCK VERIFICATION

(71) Applicant: Dell Products L.P., Round Rock, TX (US)

(72) Inventors: Gokul Thiruchengode Vajravel, Bangalore (IN); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/818,654

(22) Filed: Mar. 13, 2020

(65) Prior Publication Data

US 2021/0286409 A1    Sep. 16, 2021

(51) Int. Cl.
G06F 1/16 (2006.01)
G06F 13/38 (2006.01)
G06F 3/02 (2006.01)

(52) U.S. Cl.
CPC .......... *G06F 1/1632* (2013.01); *G06F 1/1669* (2013.01); *G06F 3/02* (2013.01); *G06F 13/385* (2013.01); *G06F 2213/0042* (2013.01)

(58) Field of Classification Search
CPC .................................................. G06F 16/444
See application file for complete search history.

(56) References Cited

U.S. PATENT DOCUMENTS 5,835,791 A * 11/1998 Goff ................. G06F 3/023 710/62
7,093,031 B2 * 8/2006 Ray ................. G06F 9/4411 710/1
2017/0060186 A1 * 3/2017 Eliyahu ............. G06F 1/1632

* cited by examiner

*Primary Examiner* — Henry Tsai
*Assistant Examiner* — Juanito Borromeo
(74) *Attorney, Agent, or Firm* — Kirton McConkie; Brian Tucker

(57) ABSTRACT

Keyboard dock verification can be performed. A dock report can be created and stored on a keyboard dock as part of the manufacturing process. The dock report can include device information for the child devices of the keyboard dock. When the keyboard dock is attached to a computing device, a dock manager executing on the computing device can query the keyboard dock to retrieve device information for the keyboard dock's child devices. The dock manager can create a dock report from the retrieved device information. The dock manager can also retrieve the dock report that is stored on the keyboard dock and compare it to the dock report that the dock manager created. If the two dock reports match, the dock manager can determine that the keyboard dock is verified and can allow the keyboard dock, including its child devices, to be enumerated on the computing dock.

20 Claims, 12 Drawing Sheets

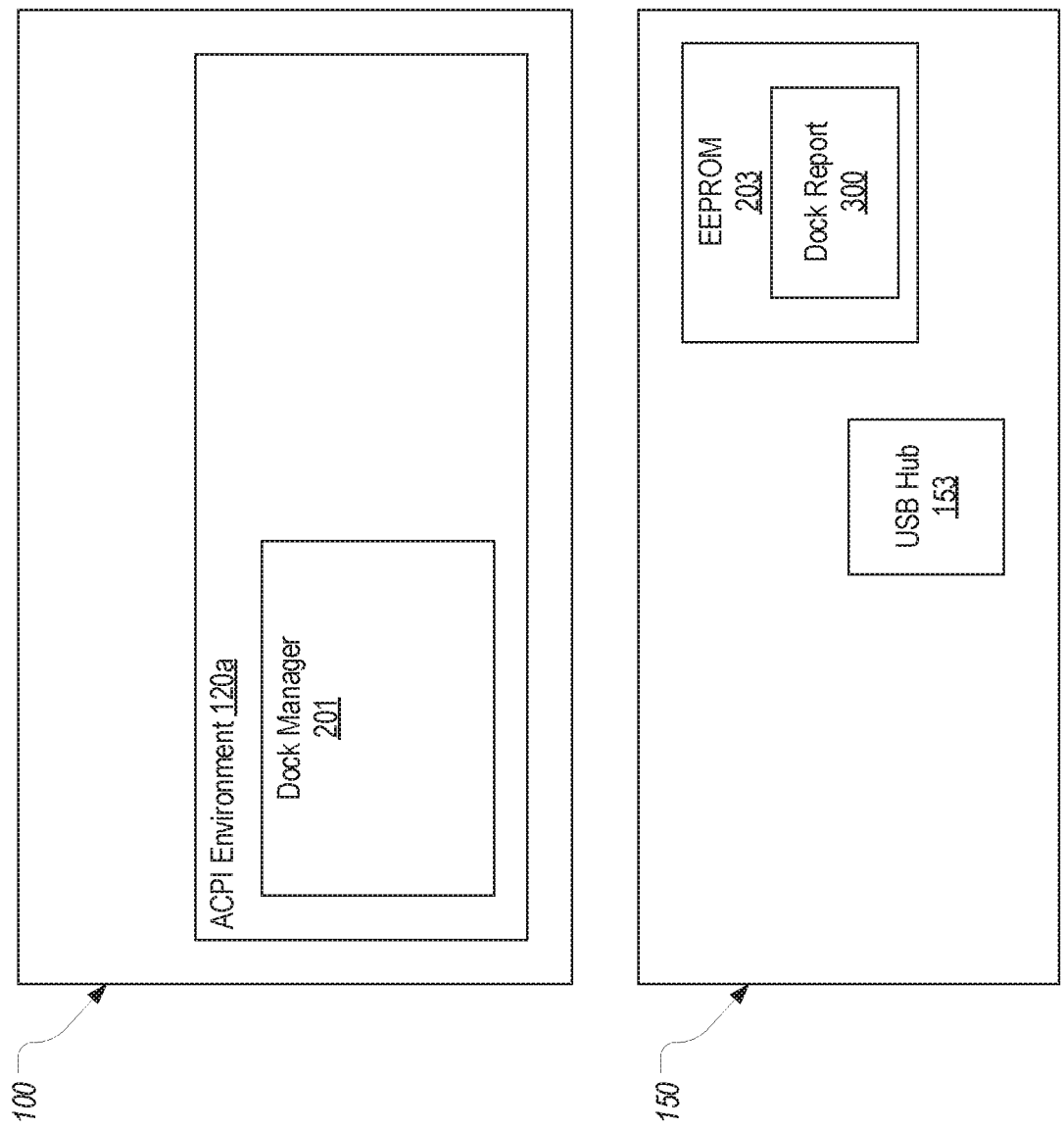

KEYBOARD DOCK VERIFICATION

CROSS-REFERENCE TO RELATED APPLICATIONS

N/A

BACKGROUND

The term "2-in-1" is commonly used to refer to laptops that have a touchscreen and represents that the laptop may be used in a typical fashion, i.e., by typing on the keyboard, or as a tablet, i.e., by interfacing with the touchscreen. Such 2-in-1 computing devices are oftentimes detachable from the "keyboard dock." In other words, the 2-in-1 computing device is a separate component from the keyboard dock. Many tablets are also capable of being attached to a keyboard dock. FIGS. 1A and 1B provide examples of a computing device 100 that can be used with a detachable keyboard dock 150. The present disclosure primarily relates to any type of computing device that may employ a detachable keyboard dock.

Original equipment manufacturers (OEMs) oftentimes desire to prevent the use of non-OEM keyboard docks (i.e., keyboard docks not manufactured by the OEM) with their computing devices. For example, a non-OEM keyboard dock may not function properly when attached to the computing device causing the user to believe the computing device is faulty. A non-OEM keyboard dock may also create a security vulnerability because, in addition to the typical keyboard, trackpad and trackball, it may have other devices such as USB ports, a Bluetooth transceiver, an NFC transceiver, a smart card reader, volume/playback controls, power charger point, fingerprint scanner, etc., which may not be authorized for use with an OEM computing device or that may facilitate the injection of malicious code onto the OEM computing device.

To address such concerns, some OEMs have created proprietary pin configurations by which their OEM computing devices attach to their OEM keyboard docks. Yet, others inevitably copy the proprietary pin configurations to enable their non-OEM keyboard docks to be used with the OEM computing devices.

There may also be scenarios where an organization desires to limit which OEM keyboard docks can be used with an OEM computing device. For example, a company may desire to prevent an employee from connecting an unapproved OEM keyboard dock to the OEM computing device that the company provides to the employee. An example scenario may be where the company does not want to allow the employee to attach a keyboard dock with a USB port. In such a scenario, given that any OEM keyboard dock will likely have the same proprietary pin configuration, there is little that the company can do to prevent the employee from attaching any OEM keyboard dock.

BRIEF SUMMARY

Embodiments of the present invention extend to methods, systems, and computer program products for performing keyboard dock verification. A dock report can be created and stored on a keyboard dock as part of the manufacturing process. The dock report can include device information for the child devices of the keyboard dock. When the keyboard dock is attached to a computing device, a dock manager executing on the computing device can query the keyboard dock to retrieve device information for the keyboard dock's child devices. The dock manager can create a dock report from the retrieved device information. The dock manager can also retrieve the dock report that is stored on the keyboard dock and compare it to the dock report that the dock manager created. If the two dock reports match, the dock manager can determine that the keyboard dock is verified and can allow the keyboard dock, including its child devices, to be enumerated on the computing dock. Otherwise, the dock manager can block the keyboard dock.

In addition to verifying the keyboard dock, the dock manager may also determine whether the keyboard dock is approved to be attached to the computing device. To do so, the dock manager can retrieve a dock identifier from the keyboard dock and compare it to an approved docks list. If the comparison indicates that the keyboard dock is approved, the dock manager can allow the keyboard dock to be enumerated. A similar verification process, and possibly approval process, can be performed when other types of docks or trusted peripherals are connected to a computing device.

In some embodiments, the present invention is implemented by a dock manager that executes on a computing device as a method for verifying a keyboard dock. The dock manager can detect that a keyboard dock has been attached to the computing device. The dock manager can then retrieve, from the keyboard dock, descriptors of child devices of the keyboard dock and a dock report that has been provisioned on the keyboard dock. The dock manager can then compare the retrieved descriptors to the dock report. In response to determining that the retrieved descriptors match the dock report, the dock manager can allow the keyboard dock, including the child devices, to become accessible on the computing device.

In some embodiments, the present invention is implemented as computer storage media storing computer executable which when executed on a computing device implement a dock manager that is configured to perform a method for verifying a keyboard dock. This method includes steps of: in response to a keyboard dock being attached to a computing device, retrieving, from the keyboard dock, descriptors of child devices of the keyboard dock; retrieving a dock report that has been provisioned on the keyboard dock; comparing the retrieved descriptors to the dock report; and in response to determining that the retrieved descriptors match the dock report, allowing the keyboard dock, including the child devices, to be enumerated on the computing device.

In some embodiments, the present invention is implemented by a manager that executes on a computing device as a method for verifying a peripheral. The manager can detect that a peripheral has been attached to the computing device. The manager can then retrieve, from the peripheral, descriptors of child devices of the peripheral and a peripheral report that has been provisioned on the peripheral. The manager can then compare the retrieved descriptors to the peripheral report. In response to determining that the retrieved descriptors match the peripheral report, the manager can allow the peripheral, including the child devices, to become accessible on the computing device. In some embodiments, the peripheral may be a dock including a keyboard dock.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only some embodiments of the present invention and are not therefore to be considered limiting of its scope, the present invention will be described and explained with additional specificity and detail through the use of the accompanying drawings in which:

FIGS. 4A-4D provide an example of how a dock manager executing on a computing device can verify a keyboard dock in accordance with embodiments of the present invention;

DETAILED DESCRIPTION

Figure 1A:
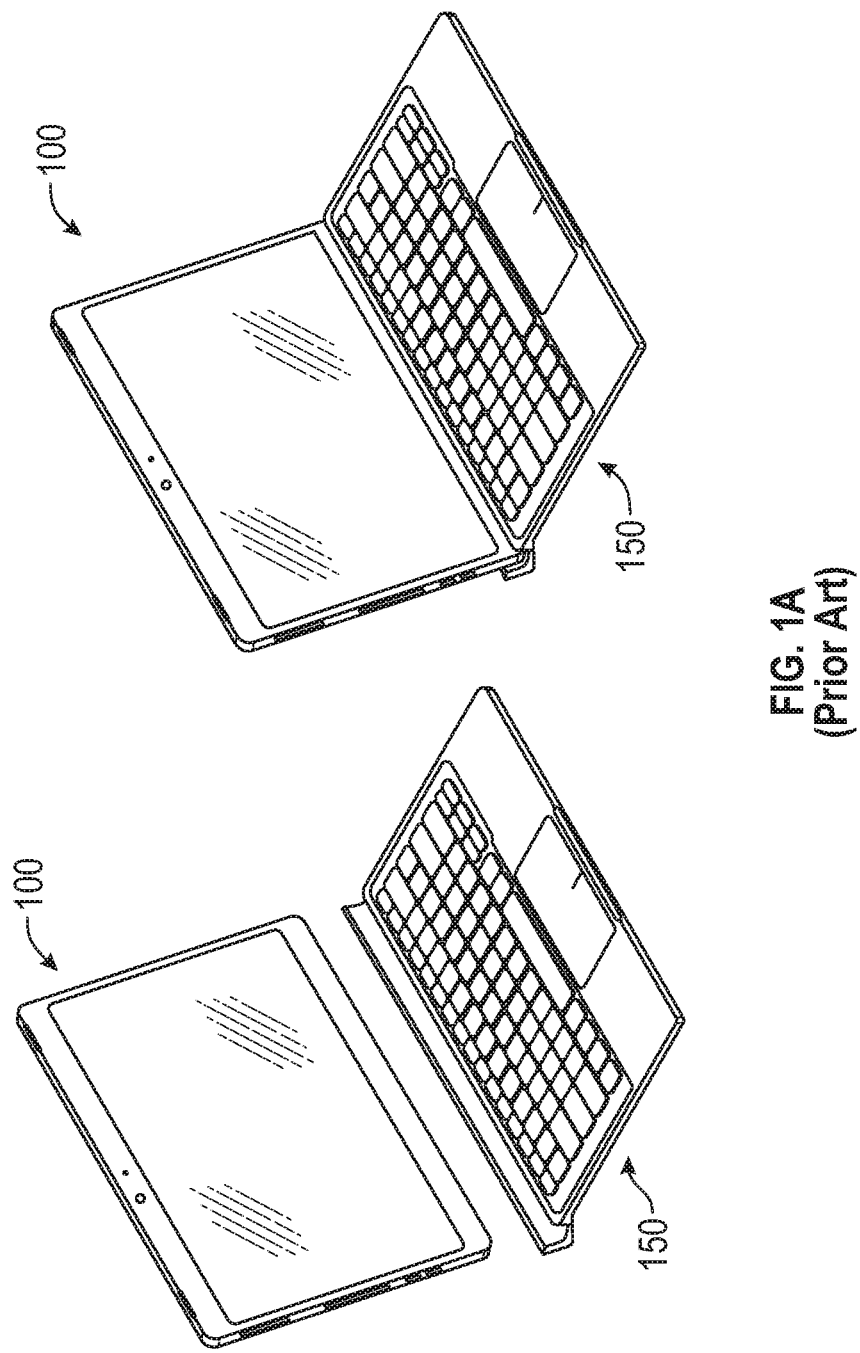
FIGS. 1A and 1B each illustrate an example of a computing device and a keyboard dock that is attachable to and detachable from the computing device.
Figure 1B:
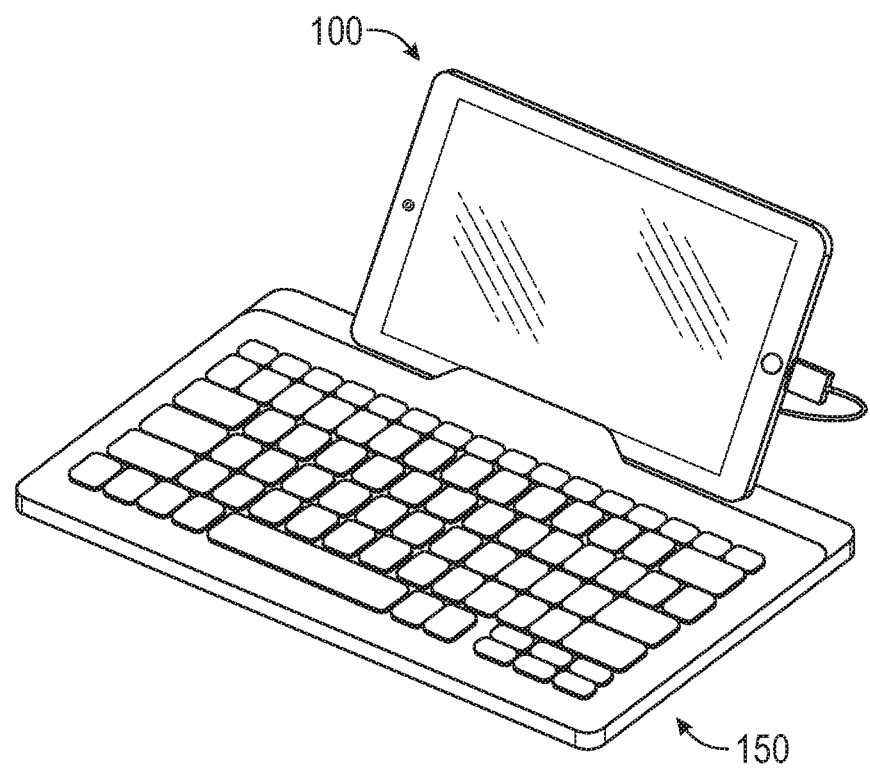

Embodiments of the present invention will be described with reference to computing device 100 and keyboard dock 150 as depicted in FIG. 1. However, embodiments of the present invention can be implemented on any computing device to which a keyboard dock, another type of dock or other peripheral may be attached.

Figure 2:
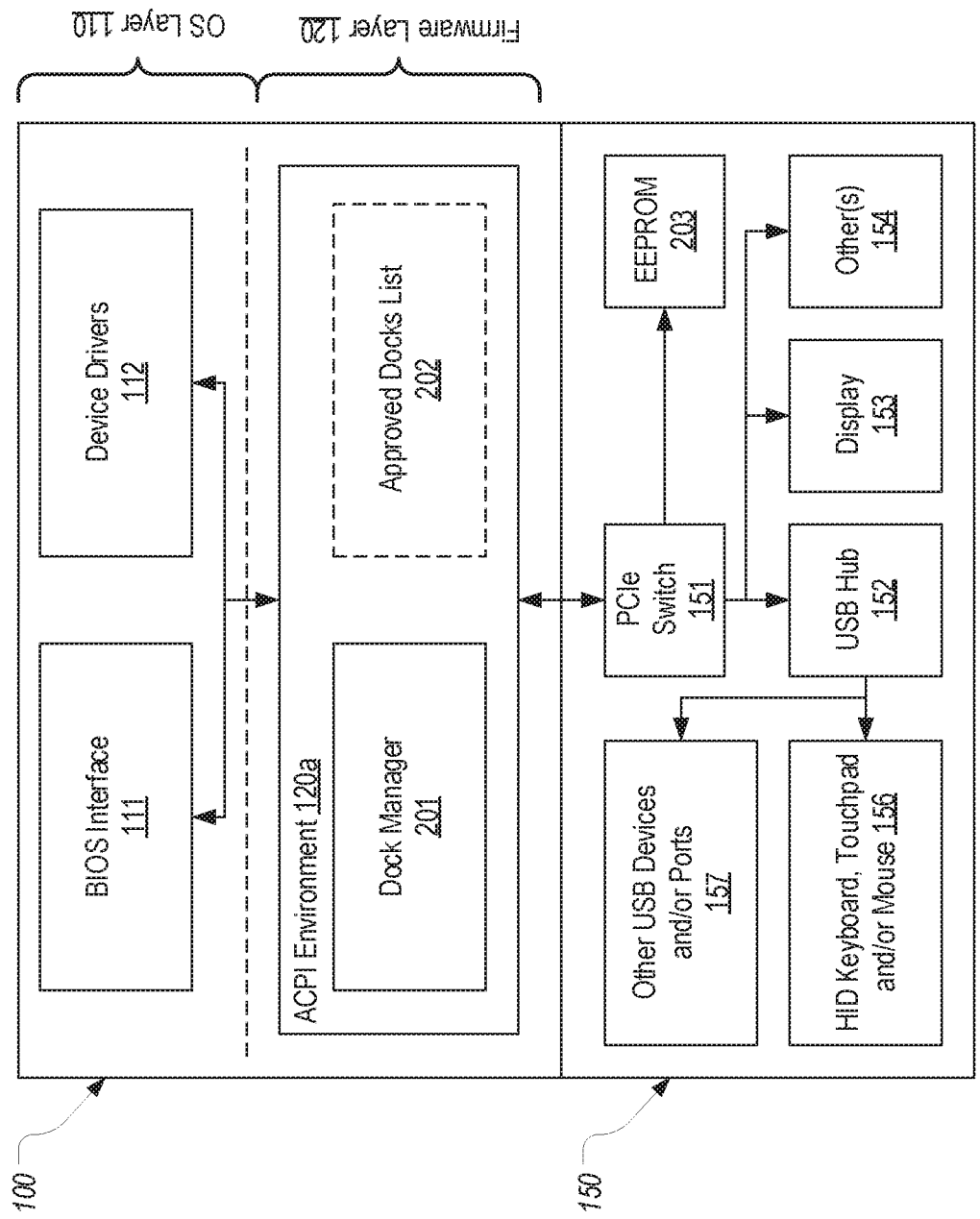
FIG. 2 illustrates an example of various components that may exist on a computing device and keyboard dock that are configured to implement embodiments of the present invention.

FIG. 2 provides an example of an architecture that may exist on computing device 100 and keyboard dock 150. The depicted architecture is merely one example and each of the depicted components need not be present on a computing device or keyboard dock that are configured to implement embodiments of the present invention. Additionally, a computing device and keyboard dock may include many other components while still being capable of implementing embodiments of the present invention.

In FIG. 2, computing device 100 is shown as having an operating system (OS) layer 110 and a firmware layer 120. Among many other components, OS layer 110 includes a BIOS interface 111 (e.g., a Unified Extensible Firmware Interface (UEFI) interface) and device drivers 112 that are loaded when keyboard dock 150, including its child devices (or peripherals), is enumerated on computing device 100. Firmware layer 120 may include an Advanced Configuration and Power Interface (ACPI) environment 120a in which a dock manager 201 executes. BIOS interface 111 may allow components in OS layer 110 to interact with components in firmware layer 110 including dock manager 201. Dock manager 201 may be in the form of a BIOS service such as, for example, a UEFI runtime service. In some embodiments, an approved docks list 202 may be stored on computing device 100 or otherwise accessible to dock manager 201 (e.g., via a network). As described below, approved docks list 202 can identify which keyboard docks dock manager 201 should allow to be used with computing device 100.

In the depicted example, keyboard dock 150 includes a PCIe switch 151 which provides the interface between computing device 100 and keyboard dock 150. A USB hub 152 is connected to PCIe switch 151 and includes a number of child devices such as a Human Interface Device (HID) keyboard, touchpad, and/or mouse 156 and other USB devices and/or ports 157. A display 153 and other devices 154 may also be connected to PCIe switch 151. Keyboard dock 150 also includes EEPROM 203 which can be EEPROM or any other type of on-board storage media that can be used to store a dock report as described below.

Figure 3:
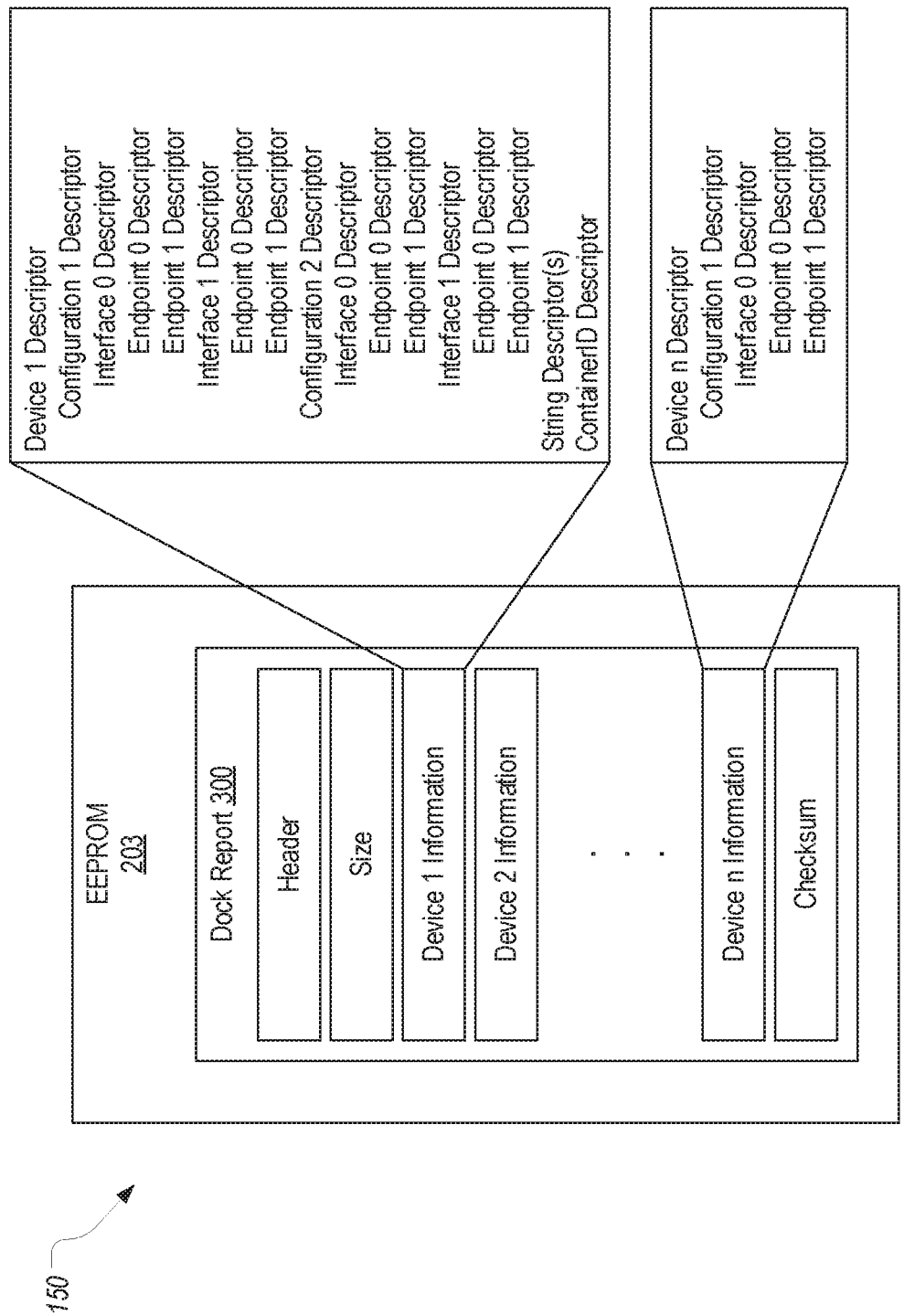
FIG. 3 provides an example of a dock report that an OEM can store on a keyboard dock to enable the keyboard dock to be verified in accordance with embodiments of the present invention.

FIG. 3 provides an example of a dock report 300 that may be stored in EEPROM 203. In some embodiments, an OEM can create and store dock report 300 in EEPROM 203 as part of the manufacturing process and/or may store dock report 300 in EEPROM 203 as part of an update (e.g., a firmware update on keyboard dock 150). Dock report 300 includes device information for each child device of keyboard dock 150. For example, if keyboard dock 150 includes a keyboard, trackpad and trackball HID device, a Bluetooth transceiver and an NFC transceiver, dock report 300 could include separate device information for each of these child devices. The device information for a particular device can include a set of the various USB descriptors for the particular device. For example, in FIG. 3, device 1 information, is shown as including the device descriptor, two configuration descriptors each of which has two interface descriptors with two endpoint descriptors each, one or more string descriptors and a containerID descriptor. In contrast, device n information is shown as including the device descriptor, a single configuration descriptor having a single interface descriptor with two endpoint descriptors. In addition to this device information, dock report 300 may also include a header and a size field which can describe dock report 300. Dock report 300 may also include a checksum. Although not shown, the OEM may encrypt dock report 300, such as by using the OEM's private key, and then store the encrypted dock report 300 in EEPROM 203.

Figure 4B:
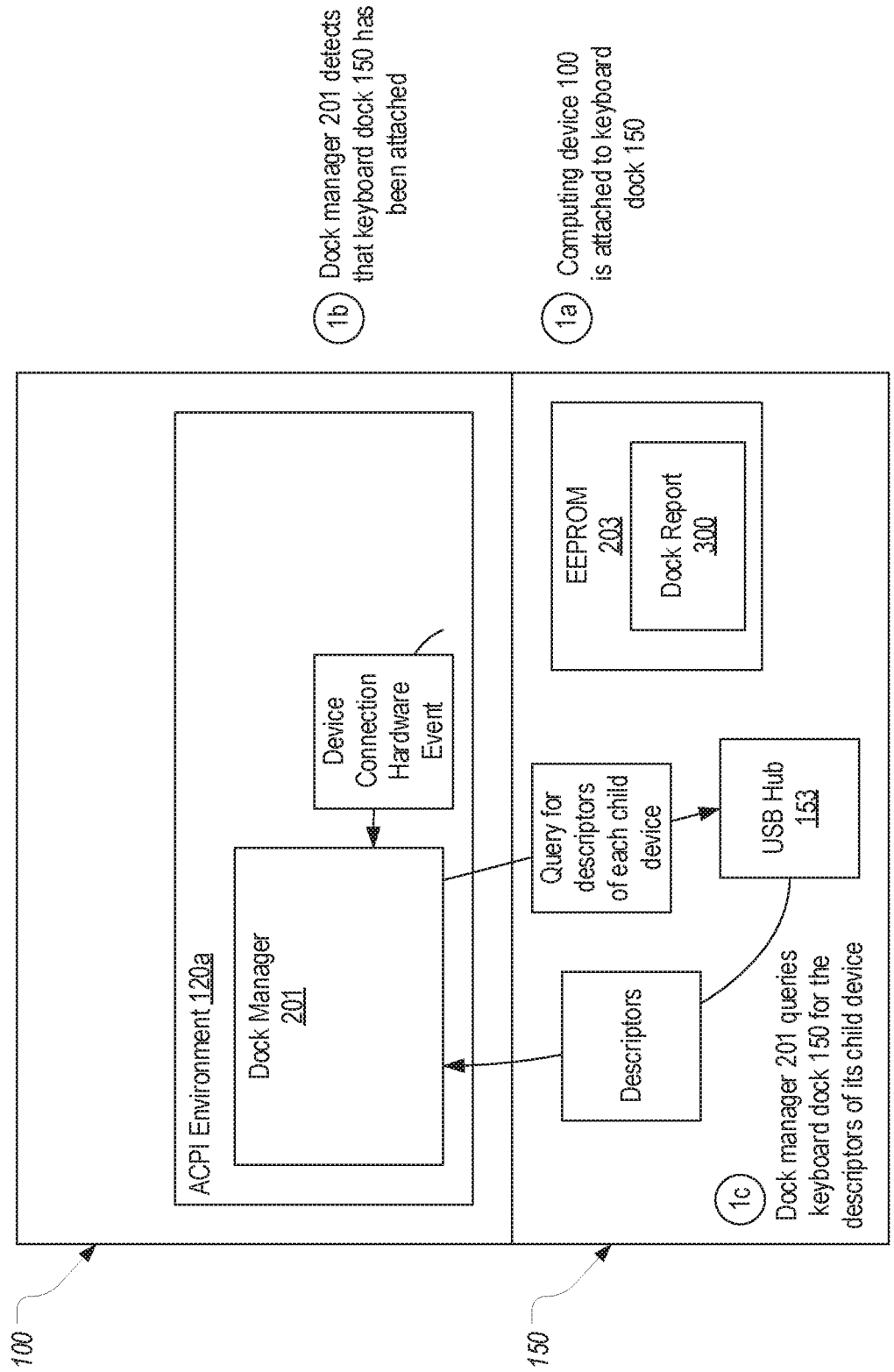

FIGS. 4A-4D represent how dock manager 201 can verify keyboard dock 150 when keyboard dock 150 is attached to computing device 100. In these figures, various components have been removed relative to FIG. 2 to simplify the illustration. In FIG. 4A, it is assumed that keyboard dock 150 has not yet been attached to computing device 100 and that dock report 300 has been stored in EEPROM 203.

Turning to FIG. 4B, in step 1a, it is assumed that keyboard dock 150 is physically attached to computing device 100. The attachment of keyboard dock 150 will cause a hardware event on computing device 100 indicative of the connection of a device. Dock manager 201, which may be executed in ACPI environment 120a, can be configured to detect such device connection hardware events or some other notification indicative of a device being connected. Accordingly, in step 1b, and in response to receiving/detecting the device connection hardware event, dock manager 201 will detect that keyboard dock 150 has been attached. In some embodiments, step 1b may include determining the type of bus to which the device connection hardware event pertains, determining whether the device is an HID device and/or determining whether the device is an HID dock. Regardless of the steps dock manager 201 performs to detect that keyboard dock 150 has been attached, in step 1c, dock manager 201 queries keyboard dock 150 for the descriptors of each child device. As shown, this could be accomplished by sending queries to USB hub 152 to retrieve the various USB descriptors for each USB device that is connected to USB hub 152. For simplicity, the child devices are not shown. However, in typical embodiments, keyboard dock 150 would include multiple and possibly many child devices, and therefore, step 1c could entail receiving a set of descriptors for multiple child devices. Dock manager 201 may cache these descriptors for subsequent use.

Figure 4C:
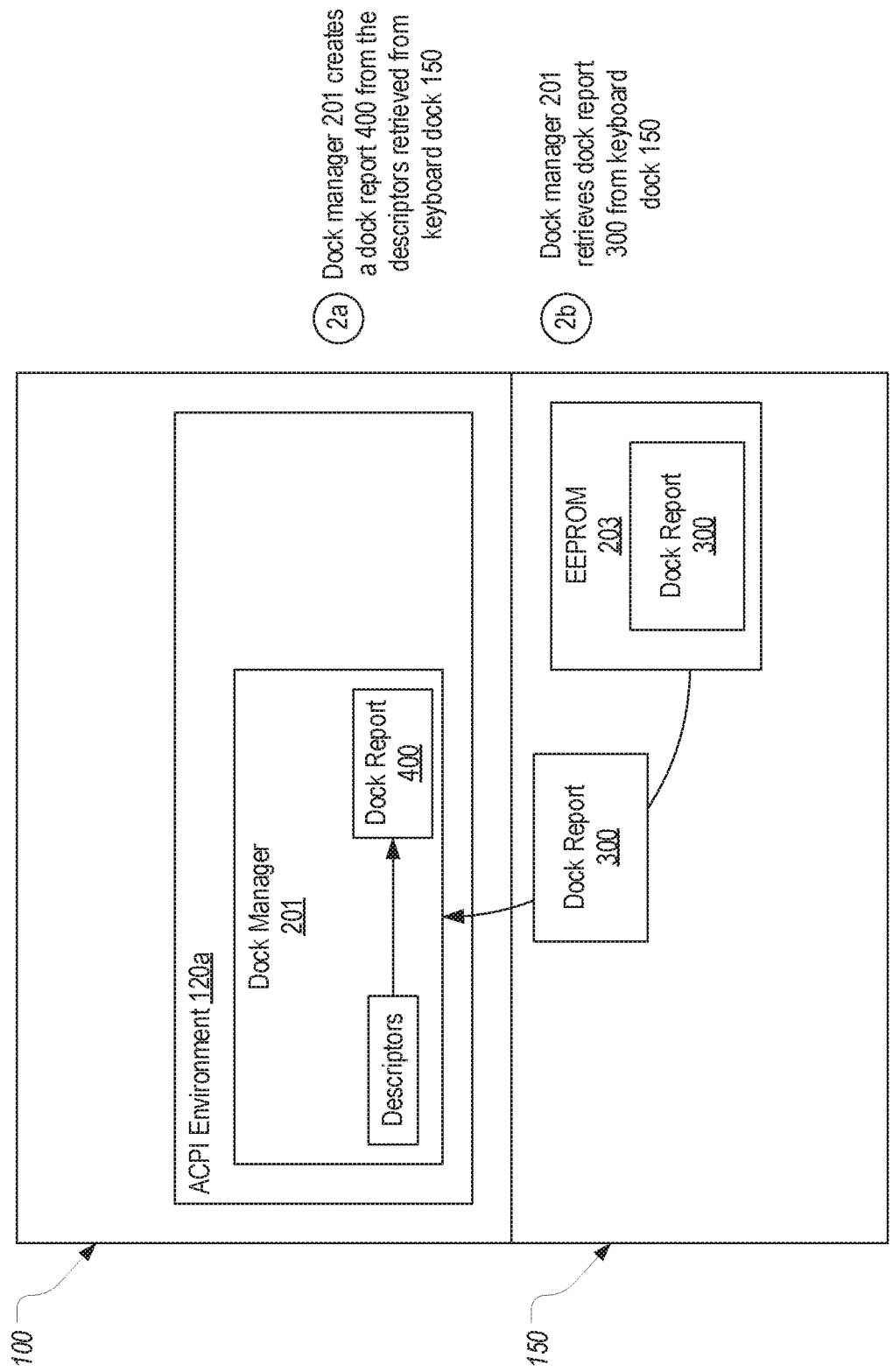

Turning to FIG. 4C, in step 2a, dock manager 201 can create a dock report 400 from the cached descriptors. Dock manager 201 can create dock report 400 using a similar technique that the OEM employed to create dock report 300. For example, dock manager 201 may combine each set of descriptors in the appropriate order, add a header and size field, append a checksum and encrypt it. In step 2b, dock manager 201 can also retrieve dock report 300 from EEPROM 203 on keyboard dock 150. Although not shown, if keyboard dock 150 did not store a dock report, dock manager 201 could fail to verify the keyboard dock and prevent it from being enumerated on computing device 100. In this way, only keyboard docks that the OEM has provisioned with a dock report will be able to attach to computing device 100.

Figure 4D:
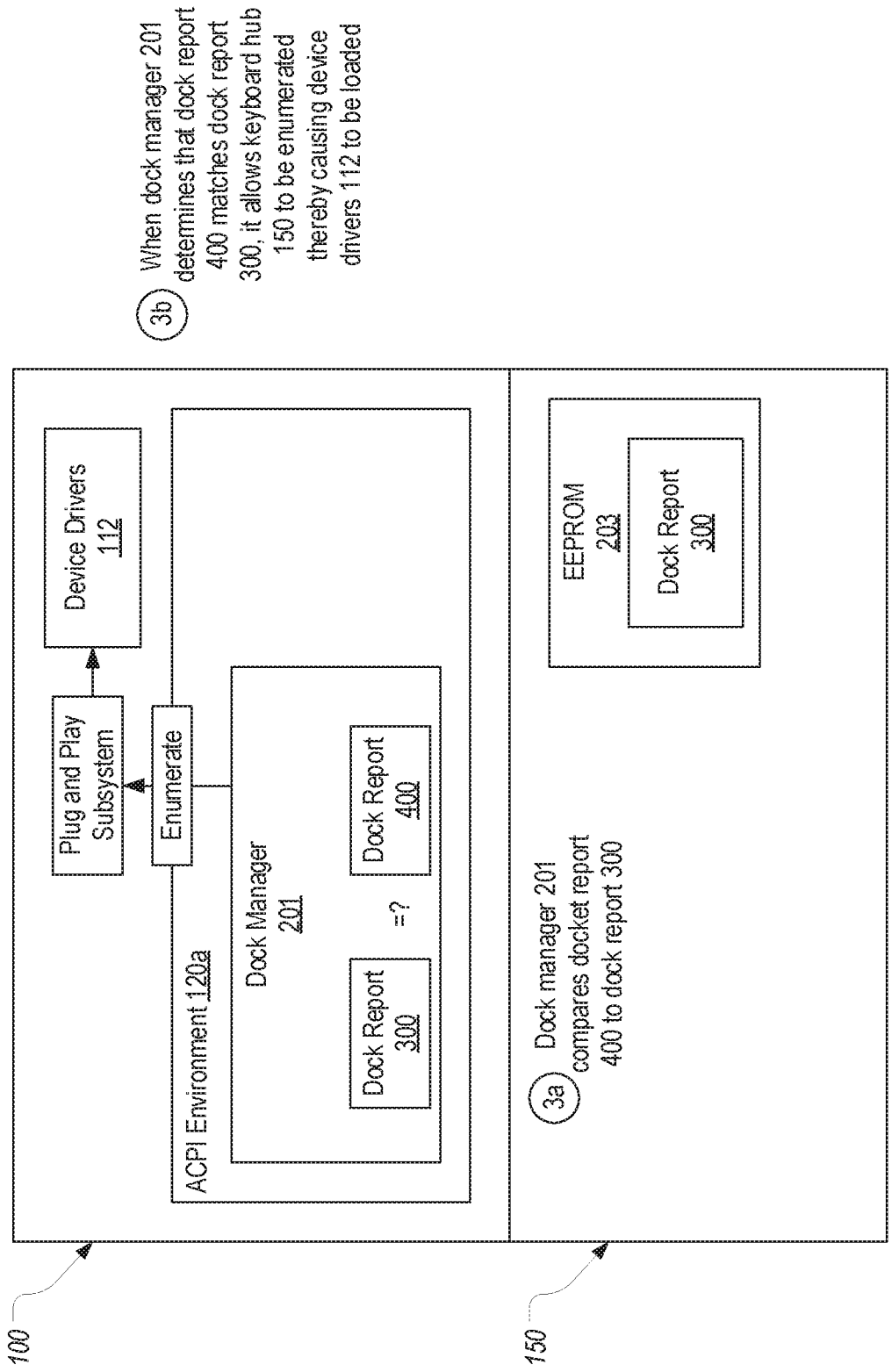

Turning to FIG. 4D, in step 3a, dock manager 201 can compare dock report 400 that it created to dock report 300 that it retrieved from EEPROM 203. These two dock reports should match if keyboard dock 150 has not been tampered with. Such tampering may be in the form of modifying dock report 300 directly, injecting interfaces or endpoints to spoof a child device (in which case, dock report 400 may include descriptors that are not included in dock report 300), modifying a descriptor of a child device, etc. If dock report 400 matches dock report 300, in step 3b, dock manager 201 can allow keyboard dock 150, including each of its child devices, to be enumerated on computing device 100 which will cause device drivers 112 to be loaded thereby making the keyboard dock's child devices accessible on computing device 100.

In the depicted example, the encrypted dock report 400 is compared to the encrypted dock report 300 to determine whether they match such as by performing a bit by bit comparison of the encrypted files. In other embodiments, however, dock manager 201 may not encrypt dock report 400. Instead, dock manager 201 may decrypt dock report 300 and then perform the comparison. In such cases, the comparison may entail determining whether dock report 400 includes all of the same device information as dock report 300.

If the comparison in step 3a fails, dock manager 201 may prevent keyboard dock 150, including all of its child devices, from being enumerated. In such cases, computing device 100 will function as if keyboard dock 150 had not been attached. In some embodiments, when dock manager 201 prevents the enumeration of keyboard dock 150, it can cause the operating system to output an alert or other notice to inform the user that keyboard dock 150 failed verification. In some embodiments, if dock report 400 partially matches dock report 300, dock manager 201 could allow any child device for which there was matching device information to be enumerated while blocking any child device for which there was not matching device information. As an example, if keyboard dock 150 includes a Bluetooth transceiver for which dock report defines device information, but an additional keyboard interface has been injected using the Bluetooth transceiver, dock report 400 would include an interface descriptor for the additional keyboard interface that would not appear in dock report 300. In such cases, dock manager 201 may block the additional keyboard interface while allowing the Bluetooth transceiver to be enumerated or may block the entire Bluetooth transceiver.

Figure 5A:
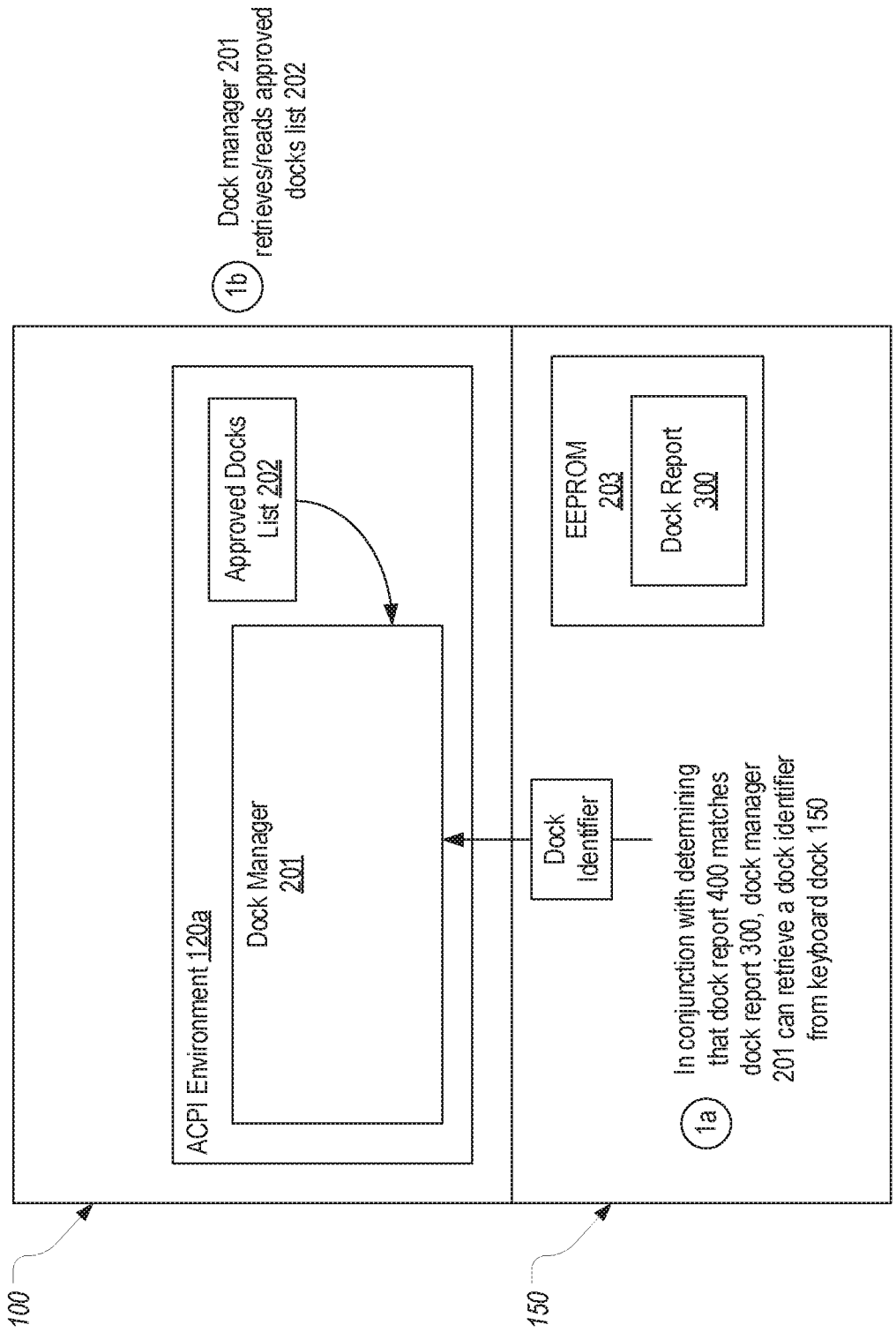
FIGS. 5A and 5B provide an example of how the dock manager can verify that a particular keyboard dock is authorized to be attached to a computing device.
Figure 5B:
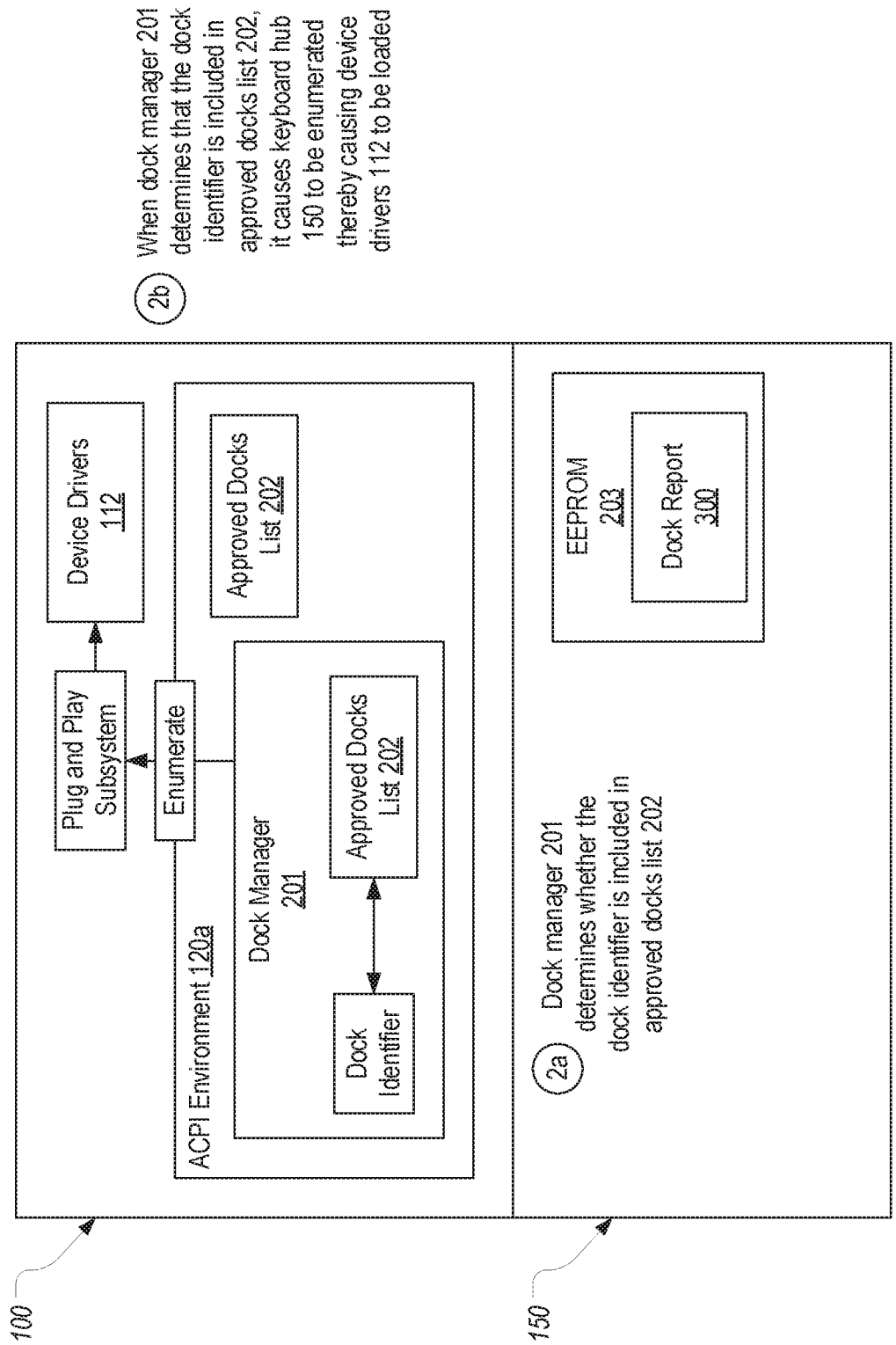

FIGS. 5A and 5B illustrate additional steps that may be performed in some embodiments of the verification process depicted in FIGS. 4A-4D. These additional steps can be performed prior to allowing the enumeration process to proceed. In step 1a, shown in FIG. 5A, dock manager 201 is shown as retrieving a dock identifier from keyboard dock 150. Although it is suggested that the dock identifier is retrieved after step 3a of FIG. 4D, dock manager 201 could retrieve the dock identifier at any time including in conjunction with querying for the descriptors in step 1c of FIG. 4B. The dock identifier can be any type of identifier that uniquely identifies a particular keyboard dock. For example, the dock identifier could be a service tag or other unique identifier.

Regardless of when dock manager 201 retrieves the dock identifier, in step 1b, dock manager 201 can retrieve/read approved docks list 202. Approved docks list 202 may be in the form of a white list, a black list or some other list that specifies the dock identifiers of allowed or disallowed keyboard docks. Approved docks list 202 may be stored locally on computing device 100 or at a remote location accessible to dock manager 201. In some embodiments, dock manager 201, or a related user mode component, may be configured to periodically query a server for updates to approved docks list 202. For example, an administrator may periodically publish updated approved docks lists for computing devices that he or she manages.

Turning to FIG. 5B, in step 2a, dock manager 201 can compare the dock identifier to approved docks list 202 to determine whether keyboard dock 150 is approved to be attached to computing device 100. For example, if approved docks list 202 is in the form of a white list, step 2a may entail determining whether the dock identifier is included in approved docks list 202. In contrast, if approved docks list 202 is in the form of a black list, step 2a may entail determining whether the dock identifier is not included in the black list. Some combination of a white list and a black list could equally be employed.

When dock manager 201 determines that keyboard dock 150 is approved to be attached to computing device 100, in step 2b, dock manager 201 can allow keyboard dock, including its child devices, to be enumerated. Step 2b in FIG. 5B is therefore similar to step 3b in FIG. 4D. On the other hand, if dock manager 201 determines that keyboard dock 150 is not approved to be attached, dock manager 201 can prevent keyboard dock 150 from being enumerated even if it has been verified in accordance with the process shown in FIGS. 4A-4D.

Figure 6A:
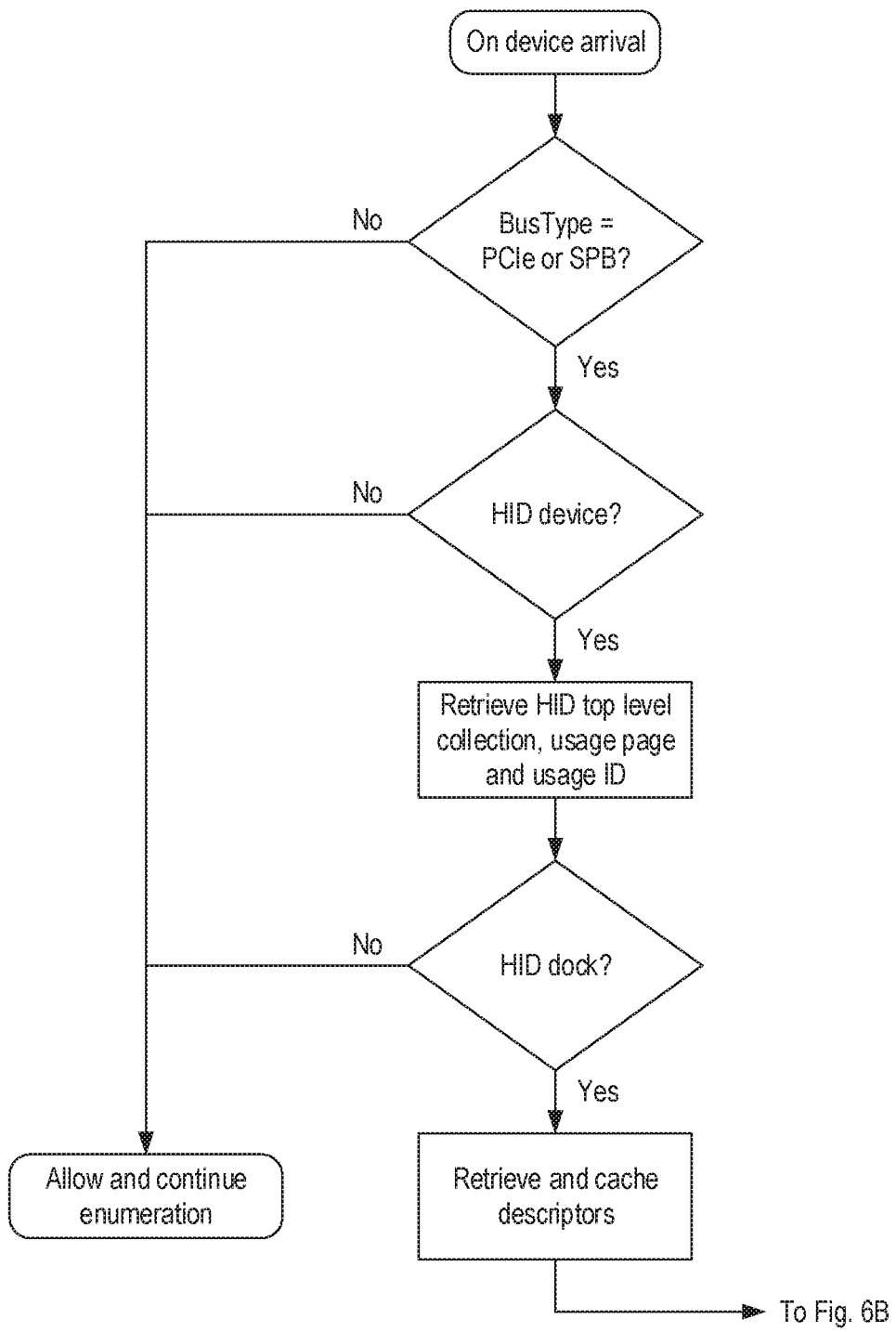
FIGS. 6A and 6B provide a flow diagram of a process that a dock manager executing on a computing device may perform in embodiments of the present invention to verify a keyboard dock that has been attached to the computing device.
Figure 6B:
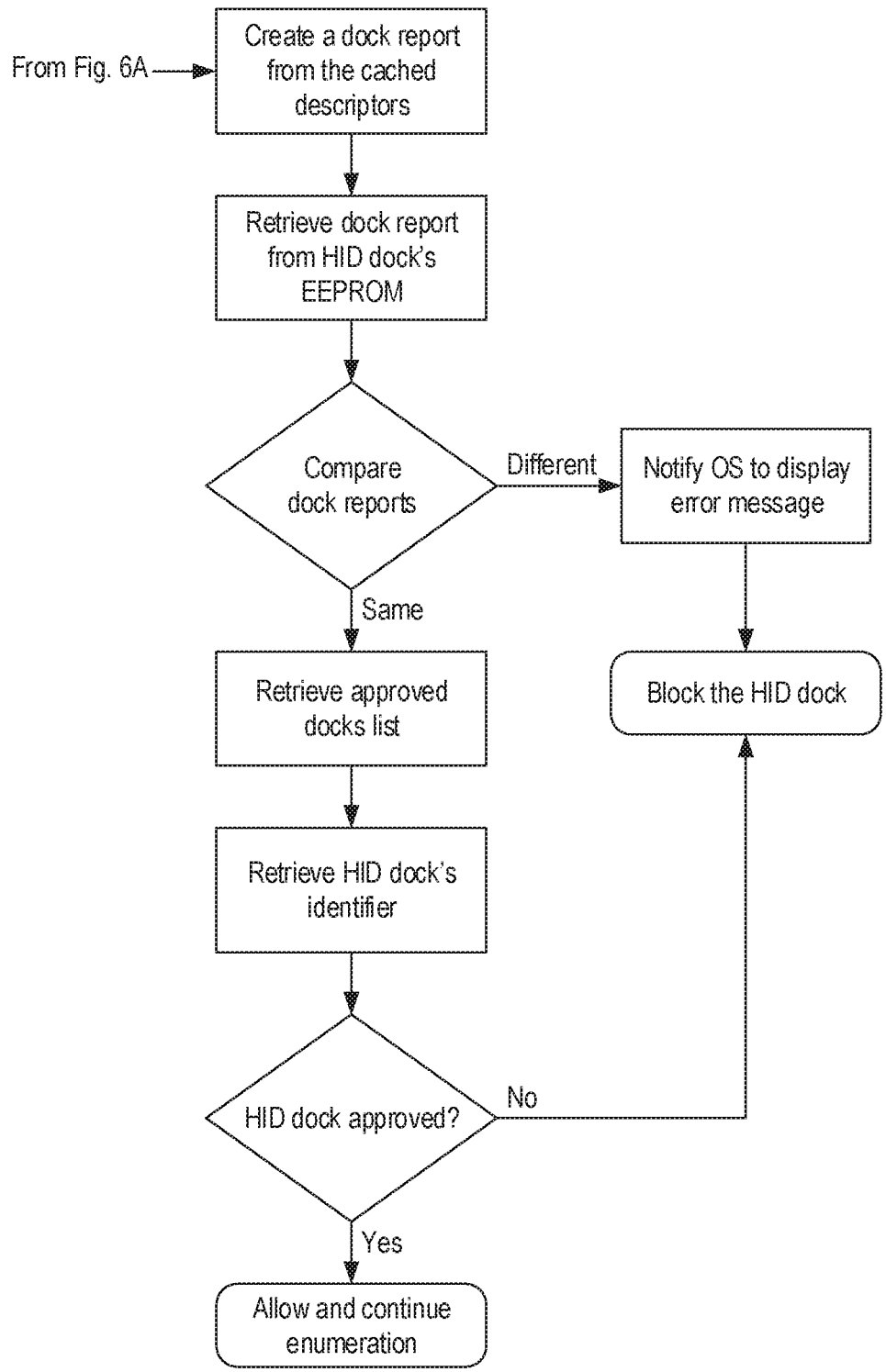

FIGS. 6A and 6B provide a flow diagram for a keyboard dock verification and approval process that a dock manager, such as dock manager 201, may perform in accordance with embodiments of the present invention. In FIG. 6A, the process is shown as commencing upon device arrival (i.e., when the dock manager detects that a device has been connected to the computing device on which the dock manager is executing). At this point, the dock manager will not yet know the exact type of device that has been connected. Accordingly, the dock manager can determine the bus type of the connected device. If the bus type is not PCIe or SPB (simple peripheral bus), the dock manager can determine that the connected device is not a keyboard dock and can therefore allow the device to be enumerated. However, if the bus type is PCIe or SPB (or another bus by which keyboard docks may be connected to computing devices), the dock manager can determine whether the connected device is an HID device. If not, the dock manager can allow the connected device to be enumerated. In contrast, if the connected device is an HID device, the dock manager can retrieve the HID top level collection, usage page and usage ID of the HID device in accordance with USB-defined techniques. The dock manager can then determine whether the connected HID device is an HID dock (e.g., a keyboard dock). For example, the dock manager may determine that the connected HID device is an HID dock when the HID device reports a usage page of 0x01 and a usage ID of 0xA0 or 0xA1. If the connected HID device is not an HID dock, the dock manager can allow the connected HID device to be enumerated. In contrast, if the HID device is an HID dock, the dock manager can retrieve and cache the descriptors of the HID dock's child devices.

Turning to FIG. 6B, after retrieving and caching the descriptors of the HID dock's child devices, the dock manager can create a dock report from the cached descriptors. The dock manager can also retrieve the dock report from the HID dock's EEPROM and then compare the two dock reports. If the two dock reports are different, the dock manager may notify the operating system to display an error message and block the HID dock, such as by preventing it from being enumerated on the computing device. Or, in some embodiments, the dock manager may allow a subset of the child devices to be enumerated where the subset includes the child devices whose device information retrieved from the HID dock matches device information contained in the dock report retrieved from the HID dock.

On the other hand, if the two dock reports are the same, the dock manager may retrieve an approved docks list and a dock identifier from the HID dock and compare them to determine whether the HID dock is approved. If so, the dock manager can allow the now verified and approved HID dock to be enumerated. If not, the dock manager can block the HID dock. As described above, in some embodiments, the dock manager may perform the verification process but not the approval process. In such cases, if the dock manager determines that the two dock reports are the same, it can proceed to allow the HID dock to be enumerated.

As suggested above, this verification process, and in some embodiments, the verification and approval process can be performed when other types of devices are connected to a computing device. For example, computing device 100 may be in the form of a traditional laptop and keyboard dock 150 may be substituted for a laptop dock (e.g., a USB-C dock). In such cases, the laptop dock can provisioned with dock report 300 and a dock manager on the laptop can query the laptop dock for the descriptors of its child devices and create dock report 400 from the descriptors. Similarly, computing device 100 could be any computing device to which a trusted peripheral (e.g., an HID keyboard with a smartcard reader or an HID keyboard with a fingerprint scanner) can be connected. In such cases, dock (or peripheral) report 300 can be provisioned on the trusted peripheral and can include the descriptors for each of its devices (e.g., the HID keyboard and the smartcard reader).

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed by a dock manager that executes on a computing device for verifying a keyboard dock, the method comprising:
   detecting that a keyboard dock has been attached to the computing device;
   retrieving, from the keyboard dock, descriptors of child devices of the keyboard dock;
   separately from retrieving the descriptors of the child devices of the keyboard dock, retrieving a dock report that has been provisioned on the keyboard dock;
   comparing the retrieved descriptors of the child devices of the keyboard dock to the dock report that was retrieved separately from the descriptors of the child devices of the keyboard dock; and
   in response to determining that the retrieved descriptors match the dock report, allowing the keyboard dock, including the child devices, to be enumerated on the computing device.

2. The method of claim 1, wherein the descriptors comprise USB descriptors.

3. The method of claim 2, wherein the USB descriptors for at least one of the child devices includes a device descriptor, one or more configuration descriptors, one or more interface descriptors and one or more endpoint descriptors.

4. The method of claim 3, wherein the USB descriptors for the at least one of the child devices also includes a containerID descriptor.

5. The method of claim 3, wherein the USB descriptors for the at least one of the child devices also includes one or more string descriptors.

6. The method of claim 1, further comprising:
creating a second dock report from the retrieved descriptors;
wherein comparing the retrieved descriptors to the dock report comprises comparing the second dock report to the dock report.

7. The method of claim 6, further comprising:
encrypting the second dock report before comparing the second dock report to the dock report.

8. The method of claim 1, wherein the child devices comprise all child devices of the keyboard dock.

9. The method of claim 1, further comprising:
retrieving a dock identifier from the keyboard dock;
employing the dock identifier to determine whether the keyboard dock is approved to be connected to the computing device; and
allowing the keyboard dock, including the child devices, to be enumerated on the computing device only when the keyboard dock is approved.

10. The method of claim 1, wherein the keyboard dock is an HID device.

11. One or more computer storage media storing computer executable which when executed on a computing device implement a dock manager that is configured to perform a method for verifying a keyboard dock, the method comprising:
in response to a keyboard dock being attached to a computing device, retrieving, from the keyboard dock, descriptors of child devices of the keyboard dock;
separately from retrieving the descriptors of the child devices of the keyboard dock, retrieving a dock report that has been provisioned on the keyboard dock;
comparing the retrieved descriptors of the child devices of the keyboard dock to the dock report that was retrieved separately from the descriptors of the child devices of the keyboard dock; and
in response to determining that the retrieved descriptors match the dock report, allowing the keyboard dock, including the child devices, to be enumerated on the computing device.

12. The computer storage media of claim 11, wherein the dock report includes descriptors for all of the child devices of the keyboard dock.

13. The computer storage media of claim 12, wherein the descriptors for at least one of the child devices includes a device descriptor, one or more configuration descriptors, one or more interface descriptors and one or more endpoint descriptors.

14. The computer storage media of claim 13, wherein the descriptors for the at least one of the child devices also includes a containerID descriptor.

15. The computer storage media of claim 11, wherein the method further comprises:
creating a second dock report from the retrieved descriptors;
wherein comparing the retrieved descriptors to the dock report comprises comparing the second dock report to the dock report.

16. The computer storage media of claim 11, wherein the method further comprises:
retrieving a dock identifier from the keyboard dock;
employing the dock identifier to determine whether the keyboard dock is approved to be connected to the computing device; and
allowing the keyboard dock, including the child devices, to become accessible on the computing device only when the keyboard dock is approved.

17. A method, performed by a manager that executes on a computing device for verifying a peripheral, the method comprising:
detecting that a peripheral has been attached to the computing device;
retrieving, from the peripheral, descriptors of child devices of the peripheral;
separately from retrieving the descriptors of the child devices of the peripheral, retrieving a peripheral report that has been provisioned on the peripheral;
comparing the retrieved descriptors of the child devices of the peripheral to the peripheral report that was retrieved separately from the descriptors of the child devices of the peripheral; and
in response to determining that the retrieved descriptors match the peripheral report, allowing the peripheral, including the child devices, to be enumerated on the computing device.

18. The method of claim 17, wherein the peripheral is a dock.

19. The method of claim 18, wherein the dock is a keyboard dock.

20. The method of claim 17, wherein the descriptors for at least one of the child devices includes a device descriptor, one or more configuration descriptors, one or more interface descriptors and one or more endpoint descriptors.

* * * * *